(12) United States Patent
Islam et al.

(10) Patent No.: US 8,554,248 B2
(45) Date of Patent: *Oct. 8, 2013

(54) SYSTEM AND METHOD OF UMTS UE LOCATION USING UPLINK DEDICATED PHYSICAL CONTROL CHANNEL AND DOWNLINK SYNCHRONIZATION CHANNEL

(71) Applicant: Andrew LLC, Hickory, NC (US)

(72) Inventors: Tariqul Islam, Germantown, MD (US); John Carlson, Dulles, VA (US); Khalid Al-Mufti, Sterling, VA (US); Ariful Hannan, Sterling, VA (US)

(73) Assignee: Andrew LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/705,820

(22) Filed: Dec. 5, 2012

(65) Prior Publication Data

US 2013/0095853 A1   Apr. 18, 2013

Related U.S. Application Data

(63) Continuation of application No. 13/269,911, filed on Oct. 10, 2011, now Pat. No. 8,331,956, which is a continuation of application No. 12/246,156, filed on Oct. 6, 2008, now Pat. No. 8,073,463.

(51) Int. Cl.
*H04W 24/00* (2009.01)

(52) U.S. Cl.
USPC .................................. 455/456.1; 455/550.1

(58) Field of Classification Search
None
See application file for complete search history.

(56) References Cited

U.S. PATENT DOCUMENTS

| 8,073,463 B2 * | 12/2011 | Islam et al. | 455/456.1 |
| 8,331,956 B2 * | 12/2012 | Islam et al. | 455/456.1 |
| 2004/0203871 A1 * | 10/2004 | Geier et al. | 455/456.1 |
| 2005/0192026 A1 * | 9/2005 | Carlson et al. | 455/456.1 |

* cited by examiner

*Primary Examiner* — Kashif Siddiqui
(74) *Attorney, Agent, or Firm* — Duane Morris LLP

(57) ABSTRACT

A system and method for estimating a location of a wireless device in a wireless communication system having a plurality of nodes and a plurality of location measurement units ("LMUs"). A set of signal samples from a first wireless device and a second wireless device may be collected by one or more LMUs in a search window. A first time of arrival ("TOA") is determined, and a second search window is estimated as a function of the first TOA. A second TOA may be determined within the second search window at a second node or one of the LMUs from the set of signal samples. A range estimate of the wireless device may then be determined, and an estimated location of the wireless device may be determined as a function of the first uplink TOA, the second uplink TOA, or the range estimate and second TOA.

3 Claims, 13 Drawing Sheets

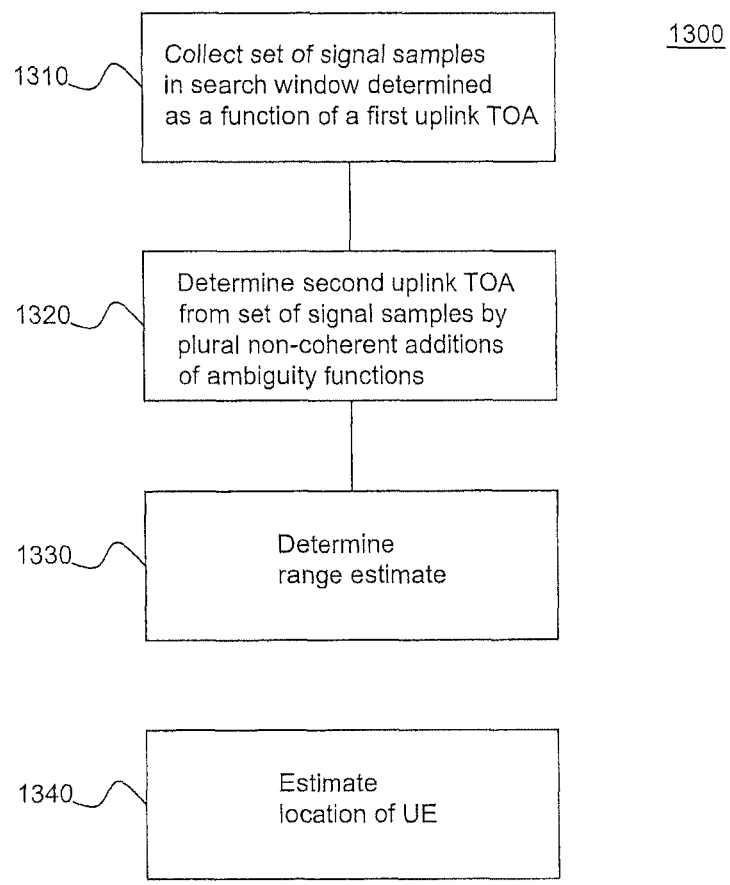

SYSTEM AND METHOD OF UMTS UE LOCATION USING UPLINK DEDICATED PHYSICAL CONTROL CHANNEL AND DOWNLINK SYNCHRONIZATION CHANNEL

RELATED APPLICATIONS

The instant application is a continuation of U.S. application Ser. No. 13/269,911, filed 10 Oct. 2011, now U.S. Pat. No. 8,331,956, entitled "System and Method of UMTS UE Location Using Uplink Dedicated Physical Control Channel and Downlink Synchronization Channel" which is a continuation of U.S. application Ser. No. 12/246,156, filed 6 Oct. 2008, now U.S. Pat. No. 8,073,463, entitled "System and Method of UMTS UE Location Using Uplink Dedicated Physical Control Channel and Downlink Synchronization Channel", and is co-pending with and related to U.S. application Ser. No. 11/984,207, filed 14 Nov. 2007, now U.S. Pat. No. 8,170,585, entitled "Ranging in UMTS Networks," and U.S. application Ser. No. 11/008,154, filed 10 Dec. 2004, entitled "System and Method for CDMA Geolocation," now U.S. Pat. No. 7,429,914, the entirety of each is hereby incorporated herein by reference.

BACKGROUND

The structure and operation of wireless communication systems are generally known. Examples of such wireless communication systems include cellular systems and wireless local area networks, among others. In a cellular system, a regulatory body typically licenses a frequency spectrum for a corresponding geographic area (service area) that is used by a licensed system operator to provide wireless service within the service area. A plurality of base stations may be distributed across the service area. Each base station services wireless communications within a respective cell. Each cell may be further subdivided into a plurality of sectors.

Location based services for mobile stations are expected to play an important role in future applications of wireless systems. A wide variety of technologies for locating mobile stations have been developed. Many of these have been targeted towards the Federal Communication Commission's ("FCC") requirement to determine the location of emergency 9-1-1 callers with a high degree of accuracy. The Wireless Communications and Public Safety Act ("the 911 Act") was enacted to improve public safety by encouraging and facilitating the prompt deployment of a nationwide, seamless communications structure for emergency services. The 911 Act directs the FCC to make "911" the universal emergency number for all telephone services. Emergency calls from landlines provide the emergency dispatchers with the telephone number and the address of the caller thereby assisting emergency personnel in locating the emergency. As mobile stations became more widely used, an increasing number of emergency calls are being made from mobile stations without a fixed address. Emergency call centers have recognized that relying upon the caller to describe their location caused a delay in service. Many mobile emergency callers were unable to accurately describe their location, resulting in a further delay and, often times, a tragic outcome.

In 1996, the FCC issued a report and order requiring all wireless carriers and mobile phone manufacturers to provide the capability for automatically identifying to emergency dispatchers the location from which a wireless call was made. Implementation was divided into two phases. Phase I required wireless service providers and mobile phone manufacturers to report the telephone number of the mobile phone making the call as well as the base station controlling the mobile station which provided a general area from which the call was made. This information can be obtained from the network elements. Phase II of the FCC's Enhanced 911 ("E-911") mandate stated that by Oct. 1, 2002, wireless service providers must be able to pinpoint, by latitude and longitude, the location of a subscriber who calls emergency from a mobile station. Wireless service providers were given the option of providing a network-based solution or a handset based solution. Wireless service providers who select a network-based solution are required to locate a mobile phone within 100 meters 67% of the time.

Typical mobile station location technologies may be classified into external methods or network based methods. One example of an external method is the Global Positioning System ("GPS"). Network based methods may be further categorized depending on whether it is the network or the mobile station that performs necessary signal measurements. These signal measurements may involve the reception time of signals communicated between a base station ("BS") and a mobile station ("MS"), the angle of arriving signals or round trip delay measurements of signals communicated between a serving BS and an MS, or combinations thereof. For example, most location methods require specific hardware in the MS and/or in the network. Traditional networks include Mobile Station Controllers ("MSC"), Base Station Controllers ("BSC") and Base Transceiver Station ("BTS") systems that jointly operate to communicate with mobile stations over a wireless communication link.

Examples of common networks include Global System for Mobile Communication ("GSM") networks, North American Time Division Multiple Access ("TDMA") networks, Code Division Multiple Access ("CDMA") networks, Universal Mobile Telecommunications System ("UMTS") networks, Worldwide Interoperability for Microwave Access ("WiMax") networks, Orthogonal Frequency Division Multiple Access ("OFDMA") networks, and WiFi networks. These networks may operate under any one or combination of the following standards: IS-95, Evolution-Data Optimized ("EVDO"), CDMA2000, Long Term Evolution ("LTE") and 1 times Radio Transmission Technology ("1×RTT"). Extensive infrastructures generally exist in the cellular wireless networks for tracking mobility, distributing subscriber profiles, and authenticating physical devices. In wireless mobile networks providing a facility to determine a mobile station's geographic position, a network component commonly referred to as a Mobile Location Center ("MLC") performs the location calculation. Furthermore, in some networks, Location Measurement Units ("LMU") may be generally required for some methods to obtain knowledge about the relative time differences for sending signals to different mobile stations.

A number of applications currently exist within communication systems for which location solutions are needed by mobile units, MSs, user equipment ("UE"), base stations or other devices and by other entities in a wireless network. There exists a need in the art to locate UMTS, OFDMA or W-CDMA mobile devices to satisfy FCC E-911 regulations as well as to provide Location Based Services for mobile phone users and to locate unknown nodes or base stations in a communications system. The 3GPP UMTS standard outlines several methods for location including Cell-ID, A-GPS, Observed Time Difference of Arrival ("OTDOA"), and Uplink Time Difference of Arrival ("U-TDOA"). The standard also provides an overview of the functionality necessary to establish, modify and maintain an UMTS link having a specified Quality of Service ("QoS"). The UMTS radio interface protocol model generally provides control over the multiplexing of traffic flows of different kinds and different origins through a layering of duties.

FIG. 1 is a diagram of a radio interface protocol reference model. With reference to FIG. 1, the radio interface protocol reference model 100 generally includes three layers 10, 20, 30. The first layer ("L1") 10 is generally a physical layer providing information transfer services as a set of WCDMA transport channels. L1 provides various handover functions, error detection and reporting to higher layers, multiplexing of transport channels, mapping of transport channels to physical channels, fast close loop power control, and frequency and time synchronization, to name a few. The second layer ("L2") 20 is generally termed as the radio link layer and allows higher layers to see only a set of radio bearers along which different kinds of traffic can be transmitted over the radio link. L2 includes several sublayers including a Medium Access Control ("MAC") sublayer 22 and a Radio Link Control ("RLC") sublayer 24. The MAC sublayer 24 generally controls data transfer to the RLC sublayer 24 and higher layers through control of transport block capacity by ensuring that capacity allocation decisions are executed promptly. The RLC sublayer 24 generally adds regular link layer functions onto logical channels provided by the MAC sublayer 22. The third layer ("L3") 30 is generally termed as the radio network layer. For L3 control protocol purposes the RLC service is generally adequate, however, for domain-specific user data, additional convergence protocols may be needed such as Packet Data Convergence Protocol ("PDCP") 26 and Broadcast and Multicast Control ("BMC") protocol 28. L3 includes a Radio Resource Control ("RRC") sublayer 32 which generally provides the functions of broadcasting information from a network to all UEs, radio resource handling (e.g., code allocation, handover, admission control, and measurement reporting/control), QoS control, UE measurement reporting and control thereof, power control, encryption and integrity protection, to name a few.

The most likely RRC service state when a voice call is active is the Cell_DCH state in which a UE continuously transmits a pilot signal unique within a coverage area. In Cell_DCH, a dedicated physical channel is allocated to the UE in the uplink and downlink spectrums, the UE is known on cell level according to its current active set, and dedicated transport channels, downlink and uplink shared transport channels, or a combination thereof may be utilized by the UE. A reverse pilot channel based location technique is disclosed in co-pending U.S. application Ser. No. 11/008,154, filed Dec. 10, 2004, the entirety of which is incorporated herein by reference. There is, however, a need to implement the location solutions in U.S. application Ser. No. 11/008,154 in a UMTS-based system.

Accordingly, there is a need for a method and system for locating a mobile appliance using an uplink dedicated physical control channel and downlink synchronization channel. Therefore, an embodiment of the present subject matter provides a method for estimating a location of a wireless device in a wireless communication system having a plurality of nodes and a plurality of location measurement units ("LMUs"). Exemplary nodes may be a base station, a sector, a repeater. The method may comprise collecting a plurality of signal samples from a first wireless device and a second wireless device by one or more LMUs in a first search window. A first time of arrival ("TOA") may be determined from the plural signal samples, and a second search window determined as a function of the first TOA. A second TOA may be determined from the plural signal samples in the second search window. A range estimate of the first wireless device may be determined, and an estimated location of the first wireless device determined as a function of the first TOA, the second TOA, or the range estimate and second TOA.

Another embodiment of the present subject matter provides a method for estimating a location of a wireless device in a wireless communication system having a plurality of nodes and a plurality of LMUs. The method may comprise collecting a set of signal samples from a first wireless device and a second wireless device by one or more LMUs in a search window determined as a function of a first uplink TOA from a first node. A second uplink TOA may be determined at a second node or the one or more LMUs from the set of signal samples. A range estimate of the wireless device may be determined, and estimated location of the wireless device determined as a function of the first uplink TOA, the second uplink TOA, or the range estimate and second TOA.

One embodiment of the present subject matter may provide a method for estimating a location of a wireless device comprising collecting signal samples from the wireless device by one or more LMUs and detecting a TOA from the signal samples by segmenting the collected signal samples to a predetermined length, determining an ambiguity function or correlation for each segment, and adding the ambiguity functions or correlations to detect a TOA. An estimated location of the wireless device may be determined as a function of the TOA.

Another embodiment of the present subject matter may provide a method for estimating a location of a wireless device comprising collecting signal samples from the wireless device by one or more LMUs and detecting a TOA from the signal samples by determining a mixing product of the collected signal samples, decimating the mixing product, segmenting the decimated product to predetermined lengths, determining ambiguity functions for each segment, and adding the ambiguity functions to detect a TOA. An estimated location of the wireless device may be determined as a function of the TOA.

An additional embodiment of the present subject matter provides a method for estimating a location of a wireless device in a wireless communication system having a plurality of nodes and a plurality of LMUs. The method may comprise collecting signal samples from the wireless device by one or more LMUs, detecting a TOA from the signal samples, and determining an estimated location of the wireless device as a function of the TOA where the TOA is detected without regard to noise and gain variation in the collected signal samples.

A further embodiment of the present subject matter provides a method for estimating a location of a wireless device in a wireless communication system having a plurality of nodes and a plurality of LMUs. The method may comprise collecting a set of signal samples from a first wireless device and a second wireless device by one or more LMUs in a search window determined as a function of a first uplink TOA from a first node. A second uplink TOA may be detected at a second node or LMU from the set of signal samples by a plurality of non-coherent additions of ambiguity functions. A range estimate of the wireless device may be determined, and an estimated location of the wireless device determined as a function of the first uplink TOA, the second uplink TOA, or the range estimate and second TOA.

These embodiments and many other objects and advantages thereof will be readily apparent to one skilled in the art to which the invention pertains from a perusal of the claims, the appended drawings, and the following detailed description of the embodiments.

BRIEF DESCRIPTION OF THE DRAWINGS

FIG. 13 is an algorithm according to an embodiment of the present subject matter.

DETAILED DESCRIPTION

With reference to the figures where like elements have been given like numerical designations to facilitate an understanding of the present subject matter, the various embodiments of a system and method for Universal Mobile Telecommunications System ("UMTS") user equipment ("UE") location using uplink dedicated physical control and downlink synchronization channels are herein described. It should be noted that the terms "node(s)" and "site(s)" are utilized interchangeably through the present disclosure and such use is not intended to limit the scope of the claims appended herewith.

Figure 1:
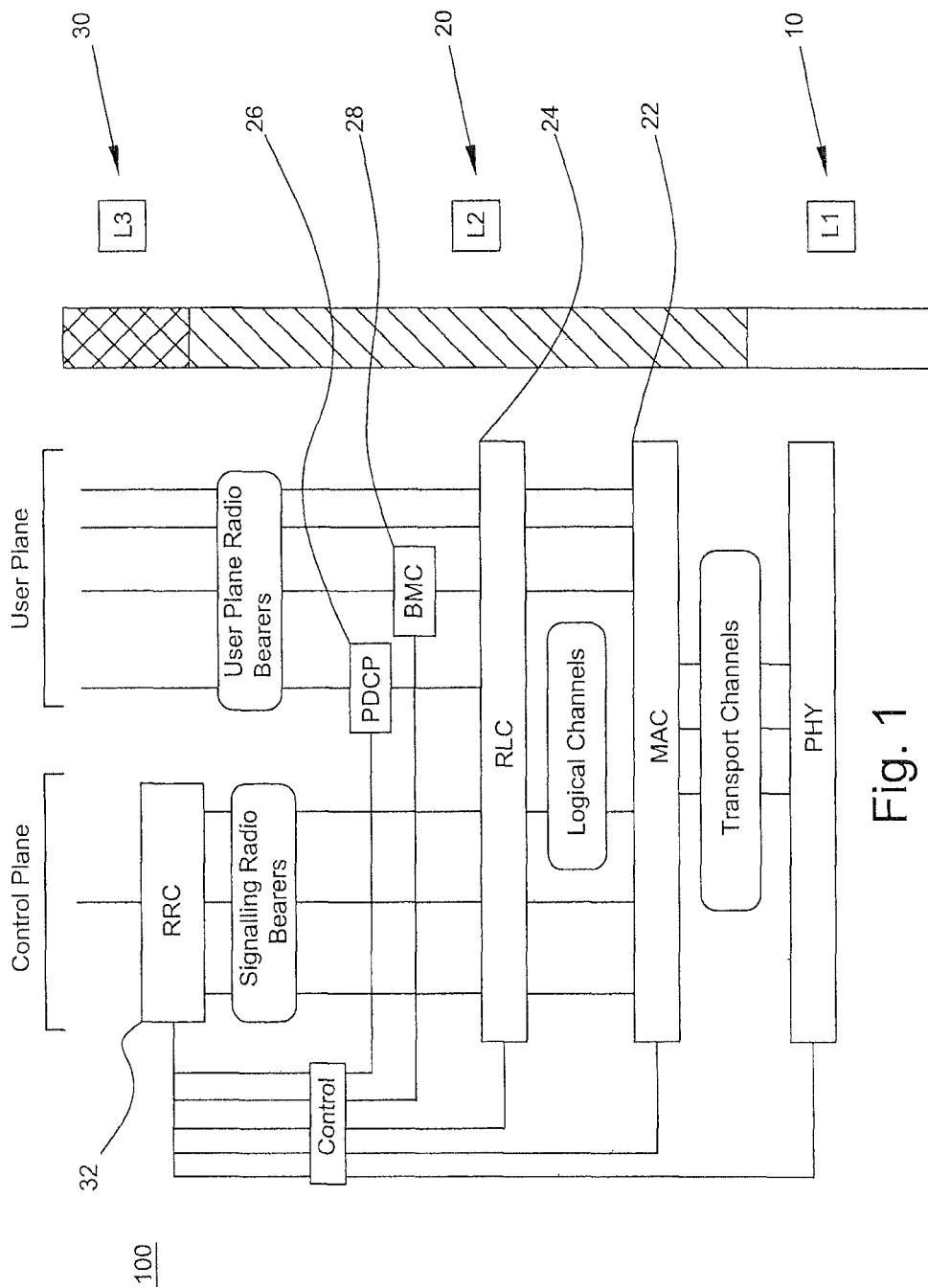
FIG. 1 is a diagram of a radio interface protocol reference model.
Figure 2:
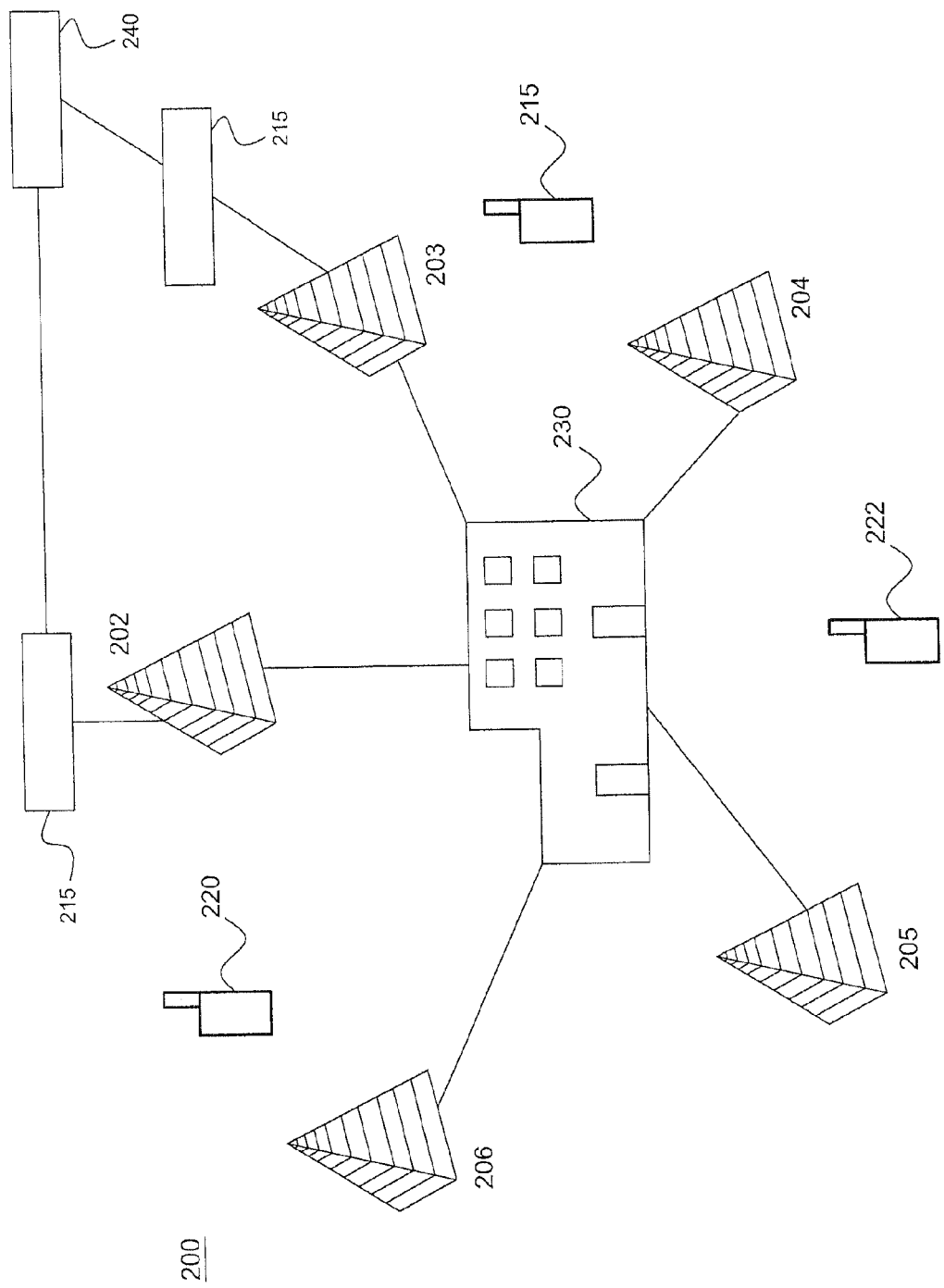
FIG. 2 is an illustration of an exemplary wireless communications network according to an embodiment of the present subject matter.

FIG. 2 is an illustration of an exemplary wireless communications network according to an embodiment of the present subject matter. With reference to FIG. 2, a wireless communications network 200 or system is shown. The network may be a Global System for Mobile Communication ("GSM") network, a Time Division Multiple Access ("TDMA") network, Code Division Multiple Access ("CDMA") network, a UMTS network, an Orthogonal Frequency Division Multiple Access ("OFMDA") network, a Worldwide Interoperability for Microwave Access ("WiMax") network, a WiFi network, networks utilizing Evolution-Data Optimized ("EVDO"), CDMA 2000 network, 1 times Radio Transmission Technology ("1xRTT"), Long Term Evolution ("LTE") standards or another equivalent network.

Location measurement units ("LMU") or other wireless location sensors ("WLS") 215 may be dispersed throughout the system or subsystem reception area. LMUs 215 may be integrated with one or more base stations or nodes 202-206 or may be independent of a base station or node 202-206. The wireless network 200 serves mobile stations, UEs or devices 220, 222 within reception range of at least one of the base stations 202-206. Mobile stations 220, 222 may include cellular telephones, text messaging devices, computers, portable computers, vehicle locating devices, vehicle security devices, communication devices, wireless transceivers or other devices with a wireless communications interface. The base stations 202-206 may be operably connected to a central entity or central network unit 230. The central entity 230 may be a base station controller ("BSC") in a base station subsystem ("BSS"), a Radio Network Controller ("RNC") in a Radio Access Network ("RAN"), or, for GSM, General Packet Radio Service ("GPRS") or UMTS system, a serving mobile location center ("SMLC") or an equivalent. The connection from each base station to a BSC, SMLC or other central network entity may employ a direct transmission link, e.g., a wired connection, microwave link, Ethernet connection, and the like, or may be employed by one or more intermediate entities, e.g., an intermediate BSC in the case of a connection from a BTS to an SMLC for GSM. A geolocation processor or control server ("GCS") 240 may also be in wireline or wireless communication with one or more LMUs or WLSs.

Figure 3:
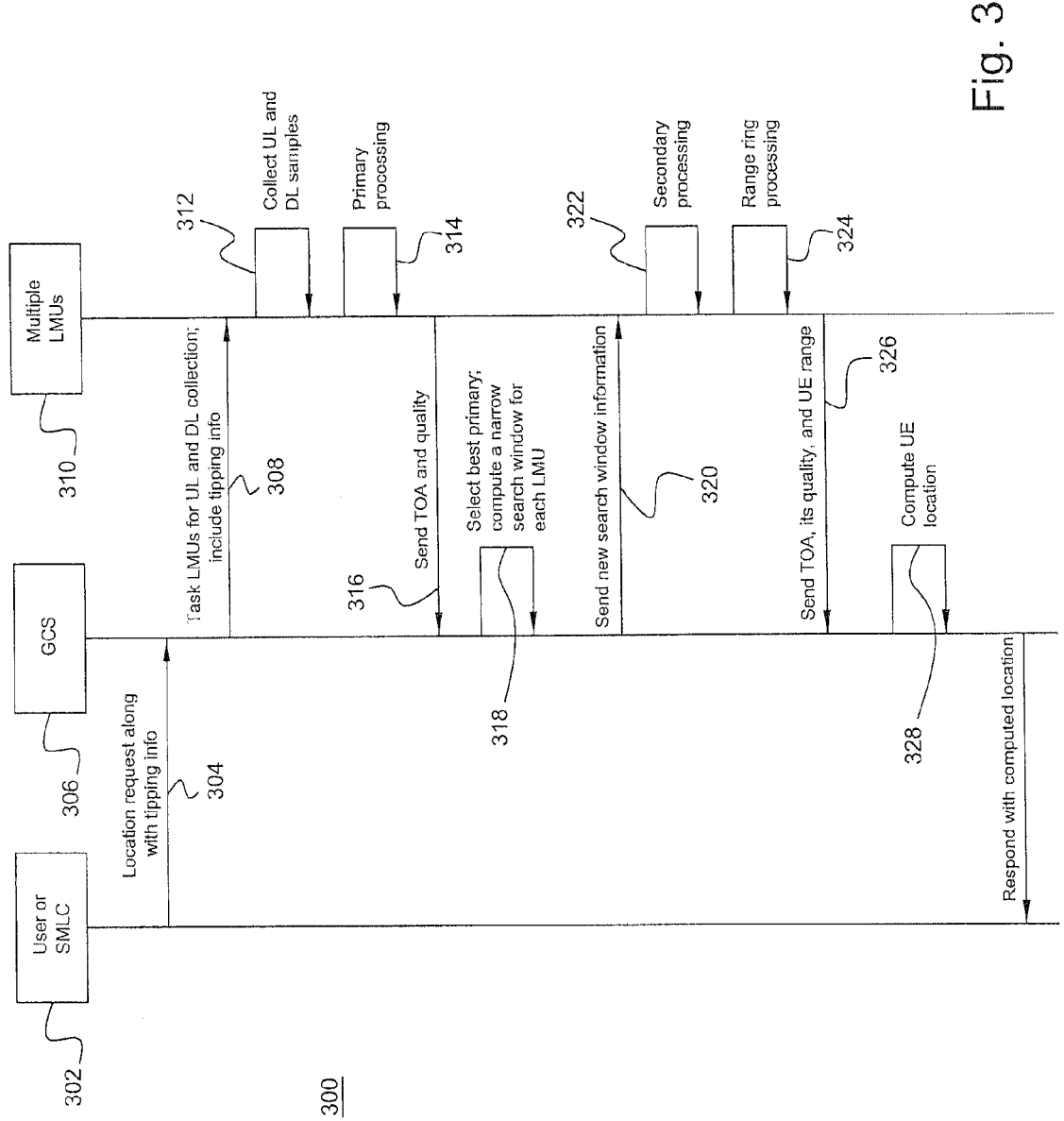
FIG. 3 is a diagram of a UMTS location method according to one embodiment of the present subject matter.

FIG. 3 is a sequence diagram of a UMTS location method according to one embodiment of the present subject matter. With reference to FIG. 3, an exemplary uplink pilot signal may be periodic with a period of 10 ms, equivalent to 38400 chips or 3000 km. Because of the complexity in searching the correlation peak within such a large timing uncertainty, a peak search may be accomplished in two stages. In the first stage, generally referred to as primary processing, a fast search algorithm having lower processing gain may be utilized to detect the peaks only at LMUs that observe a strong uplink signal. Once the preliminary peaks are found in one or more sites, the timing uncertainty may be reduced from 3000 km to a few km for all participating sites or nodes. At this stage, a high gain detection algorithm may be utilized to zoom into a narrow time window and accurately measure the uplink TOA value. The second stage of processing, generally referred to as secondary processing, may utilize a coherent and non-coherent integration approach, a multipath detection algorithm using two channels, and a peak selection algorithm to choose the statistically best TOA.

An exemplary UMTS location process 300 generally commences when a GCS 306 receives a request 304 to locate a UE from, for example, a user or SMLC 302. Along with the location request 304, the GCS 306 may also receive information identifying UE transmission characteristics and camped cell information, e.g., tipping information. This UE specific information or tipping information generally defines the uplink pilot channel, including frequency, scrambling code, pilot pattern, compressed mode, etc. 3GPP has standardized the interface for UMTS and details of tipping information may be found in 3GPP TS 25.453 V7.6.0 (2007-03) at sections 9.1.3, 9.2.2.74, 9.2.2.37, 9.2.2.42, and 9.2.2.41, the entirety of each are incorporated herein by reference. If the tipping information from the network is unavailable, equivalent tipping information may be extracted from higher layer messages (e.g., RRC CONNECTION SETUP message) exchanged between the UE and BTS. In general, any message that includes the IE 10.3.6.88 discussed in 3GPP TS 25.331 V7.4.0 (2007-03), the entirety of which is incorporated herein by reference, may be used to extract tipping information. It should be noted that this approach of extracting tipping information without network assistance is useful for drive test platform based testing and security applications. While information regarding the number of pilot bits is not readily found in the previously mentioned and incorporated IEs, the information may be derived using the existence of the Transport Format Combination Indicator ("TFCI") and the number of Feedback Information ("FBI") bit data shown in the table below taken from Section 5.2.1.1 of 3GPP TS 25.211 V7.0.0 (2006-03).

TABLE 1

DPCCH Fields

| Slot Form at #i | Channel Bit Rate (kbps) | Channel Symbol Rate (ksps) | SF | Bits/Frame | Bits/Slot | $N_{pilot}$ | $N_{TPC}$ | $N_{TFCI}$ | $N_{FBI}$ | Transmitted Slots per radio frame |
|---|---|---|---|---|---|---|---|---|---|---|
| 0  | 15 | 15 | 256 | 150 | 10 | 6 | 2 | 2 | 0 | 15 |
| 0A | 15 | 15 | 256 | 150 | 10 | 5 | 2 | 3 | 0 | 10-14 |
| 0B | 15 | 15 | 256 | 150 | 10 | 4 | 2 | 4 | 0 | 8-9 |
| 1  | 15 | 15 | 256 | 150 | 10 | 8 | 2 | 0 | 0 | 8-15 |
| 2  | 15 | 15 | 256 | 150 | 10 | 5 | 2 | 2 | 1 | 15 |
| 2A | 15 | 15 | 256 | 150 | 10 | 4 | 2 | 3 | 1 | 10-14 |
| 2B | 15 | 15 | 256 | 150 | 10 | 3 | 2 | 4 | 1 | 8-9 |
| 3  | 15 | 15 | 256 | 150 | 10 | 7 | 2 | 0 | 1 | 8-15 |

Once the tipping information is available, the GCS 306 may then task 308 one or more LMUs 310 to collect samples at the uplink and/or the downlink frequencies from the UE and Node Bs in the network. In one embodiment, the sampling rate may be selected as one to two samples per chip, but may be higher. Upon a collection of an adequate number of samples 312, the LMUs 310 may process (i.e., primary processing 314) collected uplink and/or downlink signal samples and provide 316 a best estimate of the uplink TOA to the GCS 306. For example, utilizing tipping information, the uplink pilot signal may be recreated in an LMU. The recreated signal may then be correlated against the collected uplink signal to identify the TOAs of the uplink frames. As the uplink pilot signal is periodic with a period of 10 ms (38400 chips), the timing uncertainty in detecting the peak of the pilot signal is 38400 chips. Performing an ambiguity function peak search over such a large timing uncertainly may necessitate an increased processing power and memory in the LMU. The GCS 306 may then determine 318 the boundaries of a narrow search window for each LMU 310 and provide 320 this information to each LMU 320 thereby directing the LMUs 310 to perform a more refined and thorough search, e.g., secondary processing 322, for the UE signal's TOA. Upon detecting the TOA, one or more LMUs 310 may determine a range estimation 324 of the UE by comparing uplink and downlink frame markers. The LMUs 310 may then provide the refined TOA and range estimation 326 to the GCS 306. The GCS 306 may then determine the location 328 of the UE.

Figure 4:
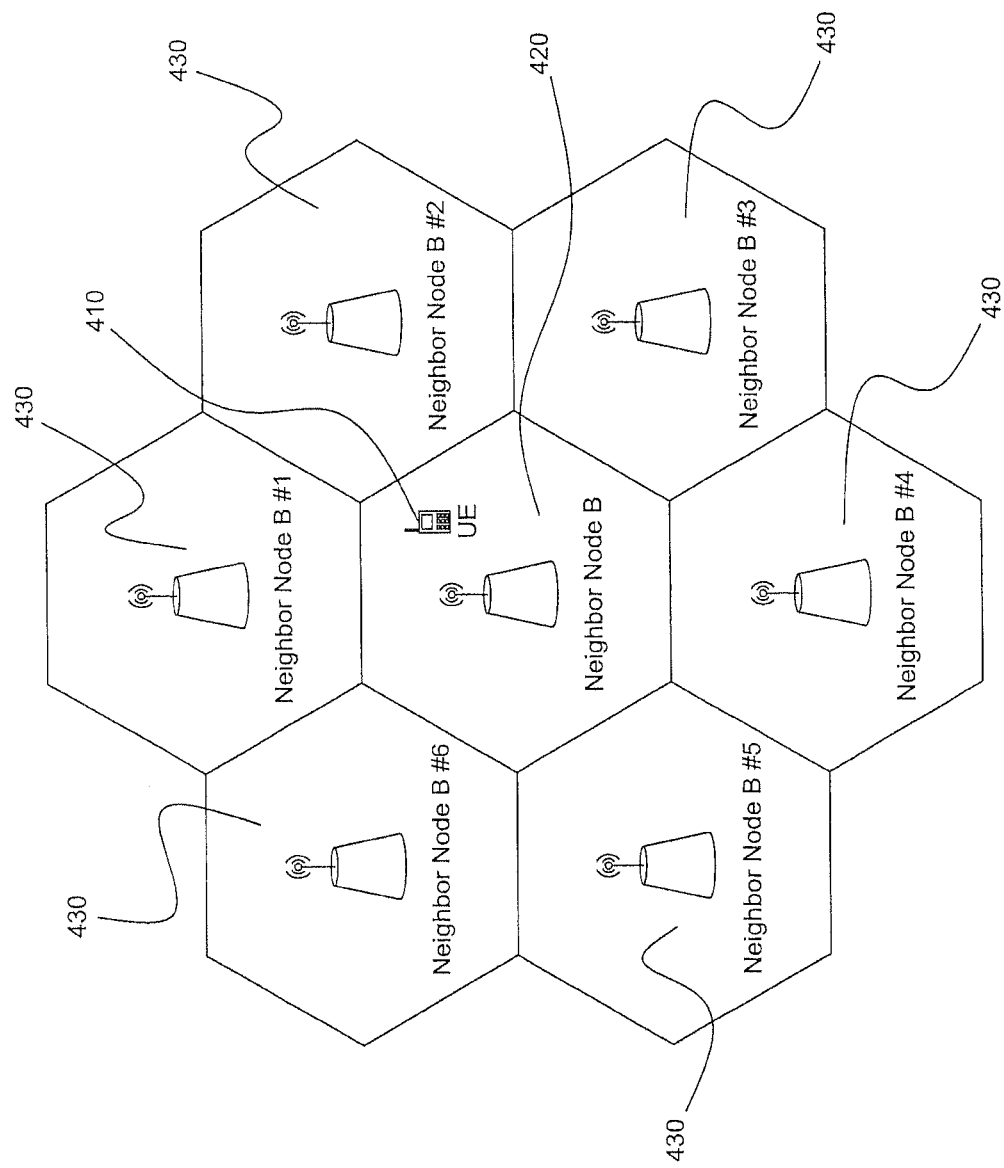
FIG. 4 is a diagram of a serving and neighboring node arrangement for a UE.

FIG. 4 is a diagram of a serving and neighboring node arrangement for a UE. With reference to FIG. 4, a UE 410 is illustrated as surrounded by one serving Node B 420 and six neighboring Node Bs 430. LMUs may or may not be installed (i.e., co-located or not co-located) at every Node B site. In an alternative embodiment of the present subject matter, processing gain in primary detection may be designed such that at least an LMU at the serving site 420 will detect the TOA of the uplink frame. Of course, other sites, such as a neighboring Node B 430 may also detect the signal. As the locations of the LMUs are known, knowing the uplink frame TOA at any one site may provide a narrower search window for the other sites, which normally could not detect the uplink frame utilizing a primary processing algorithm, to search for the uplink frame marker TOA. Once the TOA of the uplink frame is detected at one site, the timing or range uncertainty may be reduced to the size of the respective cell. For example, assume (i) that the serving Node B 420 has detected an uplink frame marker at the $n^{th}$ chip of the collected samples, (ii) that the average radius of the serving ceil is r (in chips), and (iii) that the distance between the serving Node B 420 and the neighboring Node B 430 is d (in chips). If the UE is at the location of the serving Node B, the neighbor will see the peak at (n+d) chips. If the distance between the UE and serving Node B is r, then the neighbor will see the peak between (n+d−r) and (n+d+r) chips. Therefore, the search window for the secondary sites may be reduced from 38400 chips to only 2r chips. For a large radius UMTS cell, r may be 64 chips whereby timing uncertainty corresponds to 128 chips. Timing uncertainty may be further reduced if sector geometry is considered in the respective calculations; therefore, such a reduced timing uncertainty may assist in implementing a high gain detection algorithm at the secondary sites.

Figure 5:
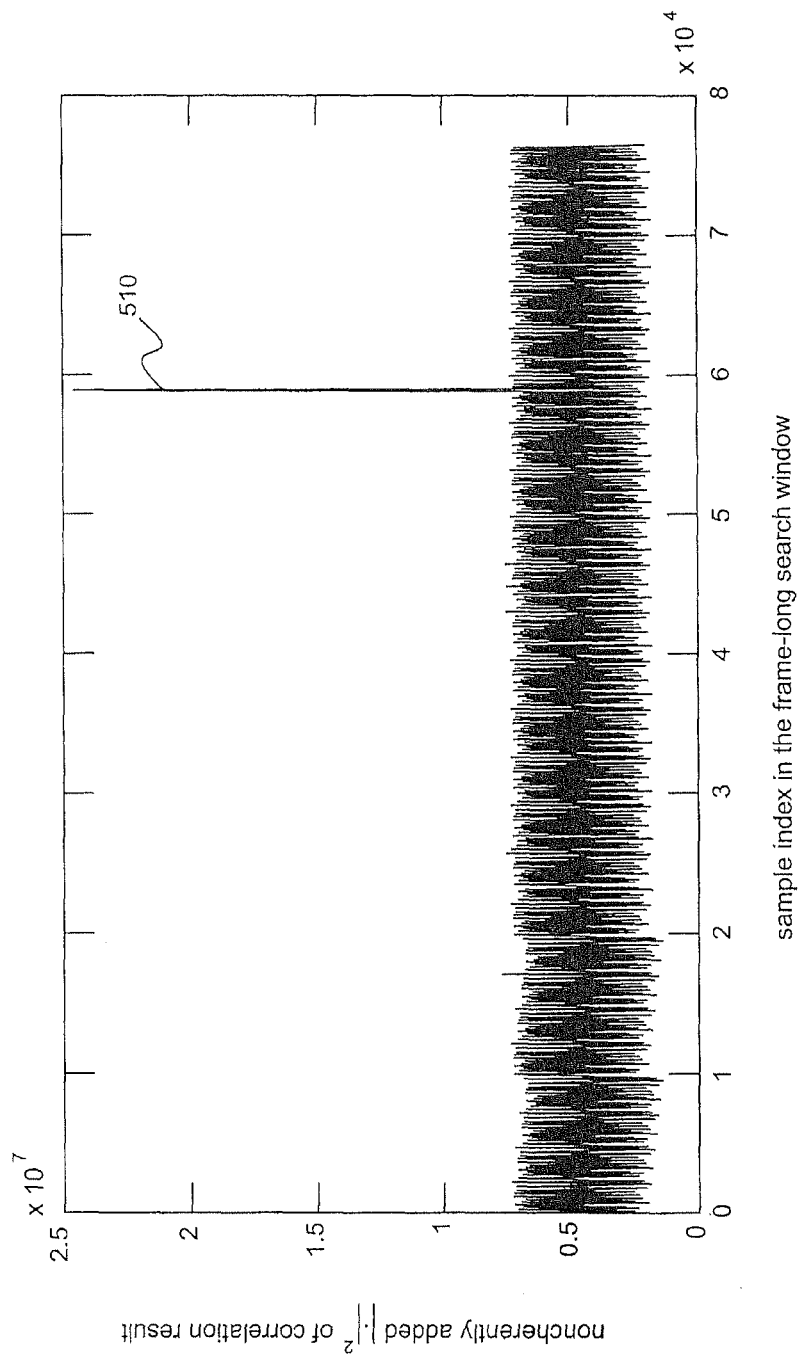
FIG. 5 is a graph showing primary peak detection using one embodiment of the present subject matter.

An exemplary primary detection process utilized in embodiments of the present subject matter may employ non-coherent integration techniques disclosed in Yousef, N., et al., "Robust Wireless Location Over Fading Channels," IEEE Transactions on Vehicular Technology, Vol. 52, No. 1, Jan. 2003 and/or Tsui, J., "Fundamentals of Global Positioning System Receivers: A Software Approach," 2nd ed. 2005, the entirety of each are incorporated herein by reference. In another embodiment of the present subject matter, a more robust detection metric may be utilized for peak detection and peak quality estimation. For example, uplink DPCCH pilot bits are distributed among 15 slots of the periodic frame. Each reference slot (containing non-zero values for the pilot bits and zero for the remaining bits) may be correlated against corresponding segments of the captured data so that the fully overlapped correlation results are exactly one frame (e.g., 15 slots) long. This correlation process may be conducted for a predetermined number of slots (e.g., 15, 30, and 60 slots, etc.). The results of these one frame long correlation outputs may then be summed after converting the correlation samples into other metrics, e.g., magnitude or square of magnitude. An analysis of this technique can be found in sections 10.6 and 10.7 of Tsui, J., "Fundamentals of Global Positioning System Receivers: A Software Approach," 2nd ed. 2005. The output of this exemplary non-coherent integration process is shown in FIG. 5. With reference to FIG. 5, a peak 510 of $5.85*10^4$ is shown utilizing this exemplary process. An exemplary peak detection and threshold setting technique is discussed in section 10.13 of Tsui, et al. This approach, however, is dependent upon automatic gain control ("AGC") performance of the data collection device, is dependent upon the number of non-coherent additions, and requires noise power measurement. In one embodiment of the present subject matter, another metric, demeaned peak to standard deviation ratio, may be employed for peak detection in the primary processing. This metric, demeaned peak to standard deviation ratio (e.g., (peak−mean)/std), does not require noise power measurement, is independent of the number of non-coherent additions, and is more robust to AGC fluctuations. Non-coherent additions of the magnitude (or magnitude squared) of correlation results elevates the noise level in the summed correlation result. Experiments conducted with real data has illustrated that the demeaned peak to standard deviation ratio metric may be indicative of the distinctness of the peak regardless of how much the mean is elevated.

An alternative embodiment may narrow the correlation peak search window in another manner. For example, the UE may transmit an uplink dedicated physical control channel/dedicated physical data channel ("DPCCH/DPDCH") frame 1024±148 chips after the reception of the first detected path (in time) of the corresponding downlink dedicated physical channel ("DPCH") or fractional dedicated physical channel ("F-DPCH") frame. Therefore, if the downlink DPCH or F-DPCH frame timing is known at a LMU co-located with the serving site, the correlation peak search window may be reduced from 38400 chips to $148*2+r_{max}$ chips, where $r_{max}$ represents the maximum search range in units of chips. For a large radius UMTS cell, $r_{max}$ may be 64 chips and the search window 360 chips. This search window may be small enough to take advantage of an exemplary long integration, high gain algorithm. Determination of the timing of downlink DPCH may be a function of the relationships of the primary common control physical channel ("P-CCPCH") and the DPCH/F-DPCH. These relationships are described in section 7.1 of 3 GPP TS 25.211 V7.0.0 (2006-03) and incorporated herein by reference. One method of obtaining P-CCPCH timing that may be implemented in the LMU is described in Annex C of 3GPP TS 25.214 V7.1.0 (2006-06) and is incorporated herein by reference. The offset between P-CCPCH and DPCH/F-DPCH is known to the RRC and is provided to the UE as discussed in IE 10.3.6.21 and 10.3.6.23ob of 3GPP TS 25.331 V7.4.0 (2007-03) and incorporated herein by reference. An exemplary network may provide this information as part of the tipping information to the SMLC, or the information may be obtained from the respective communication links.

With reference to FIG. 3, upon completion of primary processing 314, the LMUs 310 may provide the detected peak information to the GCS 306 whereby the GCS 306 selects the best primary site depending upon the signal quality. After the primary site is chosen, the GCS 306 may then determine the distance between the selected primary site and the secondary sites. The GCS 306 may then provide the primary peak location and primary to neighbor site distances to the neighbor sites for secondary processing.

Figure 6:
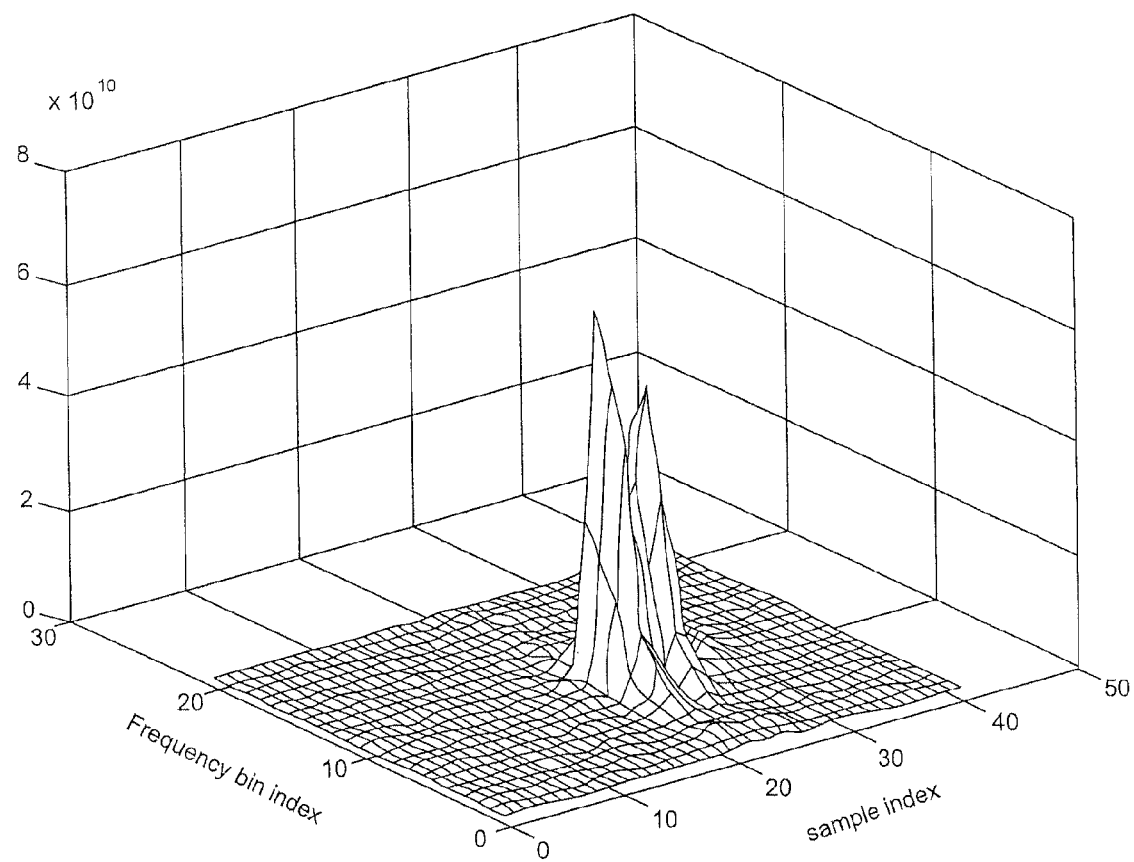
FIG. 6 is a graph showing a noncoherently added ambiguity matrix according to an embodiment of the present subject matter.

As primary processing methods according to embodiments of the present subject matter may reduce any timing uncertainty, long integration over millions of chips may be accomplished as part of any secondary processing 322. In one embodiment, the ambiguity function method described in Stein, S., "Algorithms for Ambiguity Function Processing," IEEE Transactions on Acoustics, Speech, and Signal Processing, Vol. ASSP-29, No. 3, June 1981, the entirety of which is incorporated herein by reference, may be employed to perform coherent integration for different frequency offsets. This is an effective technique for detecting peaks if the signal is coherent over a collection duration. The secondary algorithm may process signals of the order of seconds, and field tests have shown that signals may be incoherent over such a long span of time. If the frequency offsets or Doppler changes during the signal collection period, if the power fluctuations are too high, or if the timing adjustments are too frequent, non-coherent additions of smaller ambiguity functions may provide a better detection rate than a single coherent ambiguity function. As the non-coherent approach works on shorter length signals, the required FFT size is generally smaller. FIG. 6 is a graph showing a non-coherently added ambiguity matrix applied to real UMTS data according to an embodiment of the present subject matter.

As the coherence of a UE transmitted signal is unknown at the time of detection, both the coherent and non-coherent methods may be employed during secondary processing in another embodiment of the present subject matter. In one experiment, all the collected signal samples were coherently integrated using the decimation technique described in Stein, "Algorithms for Ambiguity Function Processing." Next, the data was segmented into smaller portions, and the coherent ambiguity function of each portion was non-coherently integrated. This process was repeated for different sizes of data segments. Since the demeaned peak to standard ratio metric does not depend upon number of non-coherent integrations, this metric may be employed to compare and identify the best peak among different non-coherent and coherent integration results. An advantage of embodiments employing this process is a higher probability of signal detection. Experiments with real field data also showed that weak peaks may become detectable in only a few of the different sized non-coherent ambiguity functions. For example, if two or more non-coherent ambiguity functions illustrate a weak peak around the same delay, it is likely that the peak is reliable even though the individual peaks are slightly lower than the threshold. Yet another advantage of embodiments employing this process is better TOA accuracy. For example, the UE may advance or retard its transmit time during the collection, and the multipath and delay spread may also change during a long collection thereby affecting the timing estimation of the signal. With different sized ambiguity functions, more statistics about the variation may be available, and a statistically superior scheme (e.g., the earliest TOA, average TOA, etc.) may be utilized for better accuracy. The secondary processing algorithm generally has more processing gain than the primary processing algorithm; therefore, the primary site may, in certain embodiments, perform the secondary processing.

A UE's range from a serving site or node may be estimated according to the systems and methods described in co-pending and related U.S. application Ser. No. 11/984,207, the entirety of which is incorporated herein by reference. In one embodiment, each LMU may determine the UE's range under the assumption that the LMU is located at the serving site or node. The range estimation of only the serving site or node is a valid range; however, range estimations from neighboring sites or nodes provide downlink slot marker offsets between base stations. Upon determination of the range estimation of the UE, the LMUs may provide the GCS with the estimated range, TOA, and/or TOA quality from secondary processing.

Figure 7:
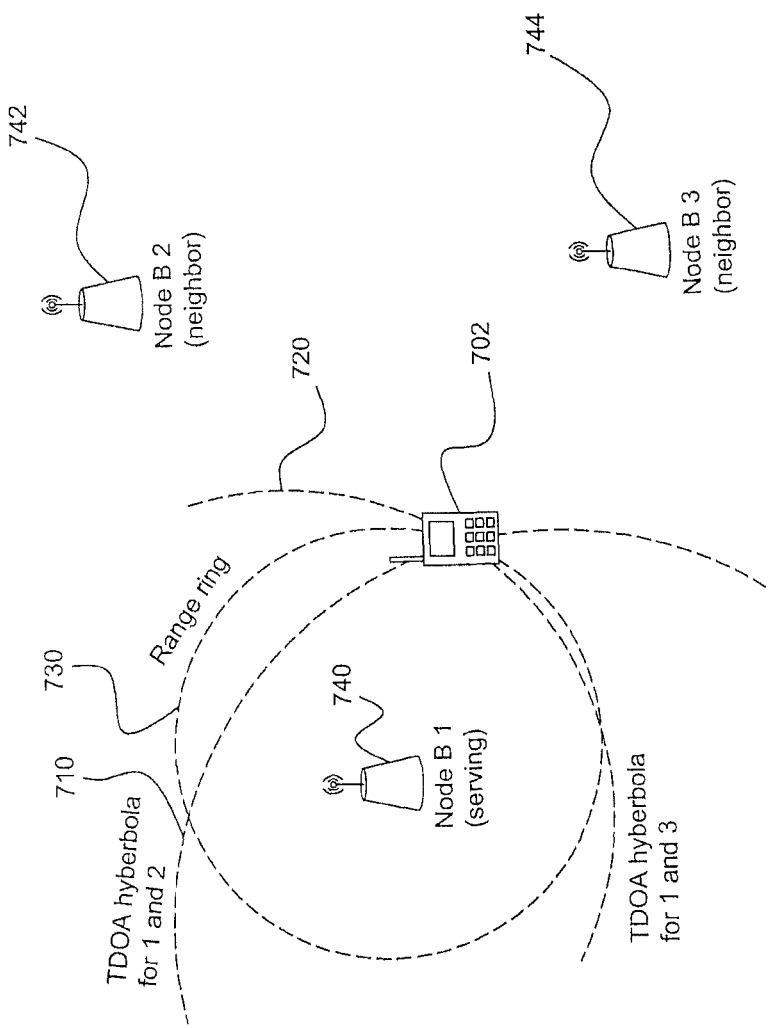
FIGS. 7 and 8 are pictorial representations of a system and method for location of a UE according to embodiments of the present subject matter.
Figure 8:
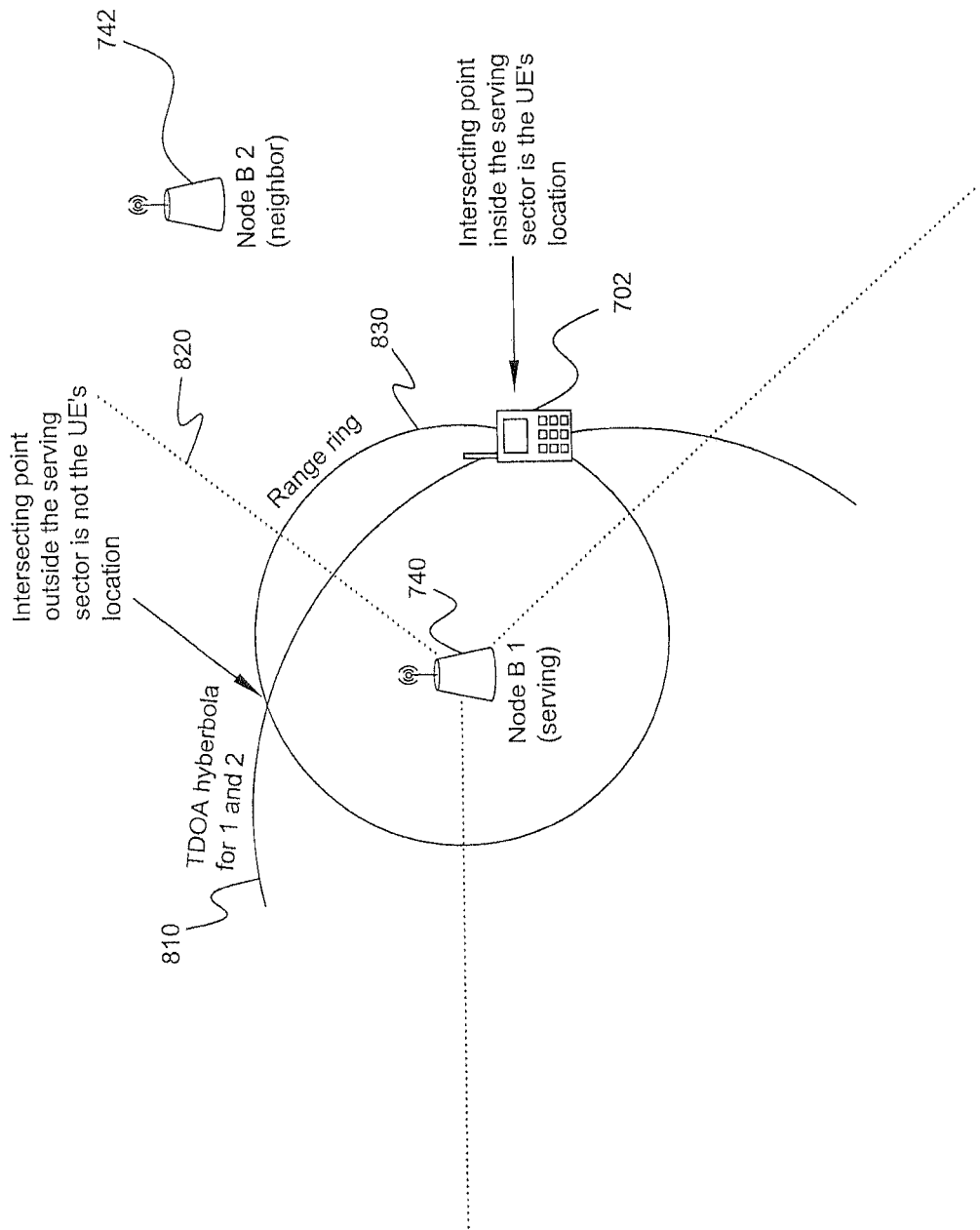

FIGS. 7 and 8 are pictorial representations of a system and method for location of a UE according to embodiments of the present subject matter. With reference to FIG. 7, a GCS may utilize the TOA and range information to determine the location of a UE 702. For example, for n=3 participating LMUs 740, 742, 744, there will be (n−1) independent hyperbolas 710, 720 and one range ring 730. Therefore, measurements from only three sites are sufficient to unambiguously locate a UE 702. With reference to FIG. 8, if measurements are available from only two LMUs 740, 742, there will be one range ring 830 and one hyperbola 810, which intersect at two points. In this example, sector geometry 820 (e.g., an intersecting point may be outside a serving sector and may be eliminated as the UE's location) may be utilized to eliminate one of the intersecting points as the location of the UE 702. In embodiments where one range ring is available, the intersection of the range ring and sector axis may be considered as the location of the UE 702. The range ring computation may also be based on the assumption that the downlink receive and uplink transmit time difference is 1024 chips. During handover, however, the downlink receive and uplink transmit time difference may not be 1024 chips, but the UE is likely to be near the cell edge and the uplink signal is usually detected by multiple LMUs. Therefore, if the range information seems erroneous, it may be ignored and UTDOA hyperbolas may be employed to determine the location of the UE 702. It should be noted that the triangulation techniques mentioned above are not dependent on any specific computation method, and the information can be rearranged to solve for the location. For example, a UE's range estimation may provide the actual transmit time of the UE, and the TOA information at the neighbor may be converted into range estimation.

In another embodiment, the network measured range ring may be combined with LMU determined UTDOA hyperbolas. For example, if the tipping information includes the IE 9.2.2.31 of 3GPP TS 25.453 V7.6.0 (2007-03), incorporated herein by reference, the range of the UE may be determined from the Round Trip Time ("RTT") and UE Rx-Tx Time Difference Type 2 parameters. If the above two parameters are converted into units of chips, the range of the UE from the serving site may be represented as (RTT−UE Rx-Tx Time Difference Type 2)/2 in chips. The range information may then be combined with the UTDOA hyperbolas to provide better location accuracy and yield. As the IE 9.2.2.31 is a part of a POSITION CALCULATION REQUEST of the Iupc interface, the standardized interface for tipping information, this exemplary embodiment of the present subject matter may provide yet another novel approach.

Figure 9:
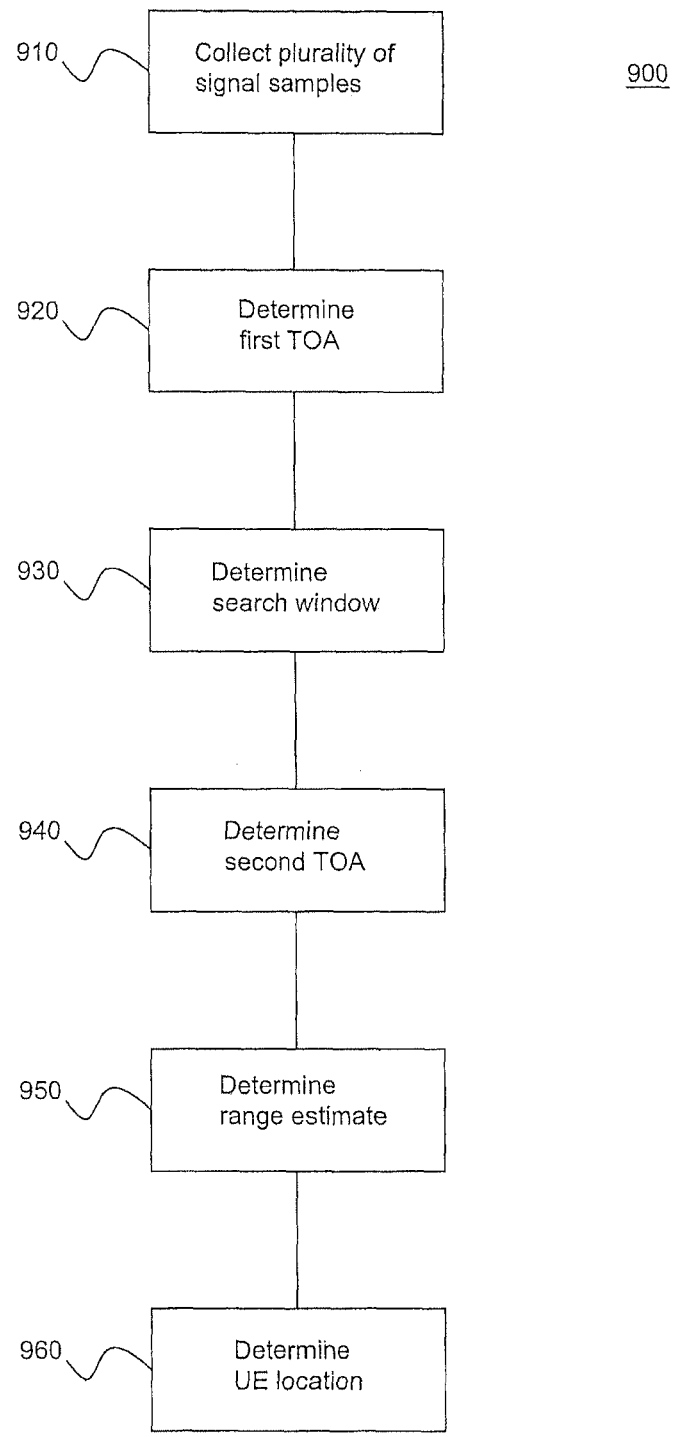
FIG. 9 is an algorithm according to an embodiment of the present subject matter.

FIG. 9 is an algorithm according to an embodiment of the present subject matter. With reference to FIG. 9, a method for estimating a location of a wireless device 900 in a wireless communication system having a plurality of nodes and a plurality of LMUs is provided. The LMUs may or may not be co-located with respective nodes. An exemplary communication system may be but is not limited to a UMTS network, WiMax network, GSM network, OFDMA network, WiFi network, and CDMA network. The system may also operate under a standard such as IS-95, EVDO, CDMA2000, LTE and 1×RTT. Exemplary nodes may be base stations, base station sectors, and combinations thereof. At step 910, a plurality of signal samples from a first wireless device and a second wireless device may be collected by one or more LMUs in a first search window. Exemplary signal samples may represent both uplink and downlink spectrums. In one embodiment the first wireless device may be a UE and the second wireless device a Node B. A first TOA may be determined from the plural signal samples at step 920, and a second search window determined as a function of the first TOA at step 930. In one embodiment, the first TOA may be determined by recreating an uplink pilot signal in at least one LMU and correlating the recreated uplink pilot signal against the plural signal samples. In an embodiment of the present subject matter, the second search window may be determined as a function of downlink dedicated physical channel frame timing or fractional dedicated channel frame timing. In another embodiment, the second search window may be determined as a function of round trip time and Rx-Tx time difference type 2 parameters.

At step 940, a second TOA may be determined from the plural signal samples in the second search window. An exemplary TOA may be an uplink signal TOA. A range estimate of the wireless device may be determined at step 950, and an estimated location of the wireless device determined as a function of the first TOA, the second TOA, or range estimate and second TOA at step 960. In an embodiment of the present subject matter, the range estimate may be determined by comparing uplink and downlink frame markers in the plural signal samples. Further, the estimated location of the wireless device may also be determined as a function of a value selected from the group consisting of sector geometry and sector axis in another embodiment. In one embodiment, the process may begin by providing a request to a geolocation control server to locate the wireless device in the communication system. This request may include tipping information provided by the communication system or the tipping information may be extracted from messages exchanged between the wireless device and a node.

Figure 10:
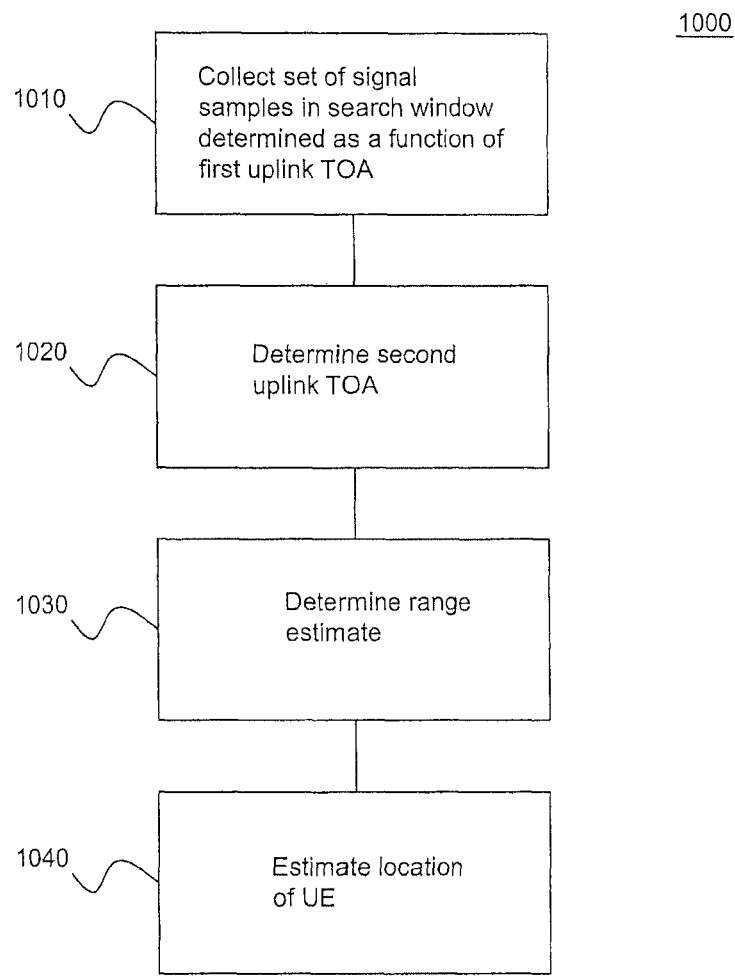
FIG. 10 is an algorithm according to another embodiment of the present subject matter.

FIG. 10 is an algorithm according to another embodiment of the present subject matter. With reference to FIG. 10, a method for estimating a location of a wireless device 1000 in a wireless communication system having a plurality of nodes and a plurality of LMUs is provided. Exemplary nodes may be base stations, base station sectors, and combinations thereof, and the LMUs may or may not be co-located with respective nodes. At step 1010, a set of signal samples from a first wireless device and a second wireless device may be collected by one or more LMUs in a search window determined as a function of a first uplink TOA from a first node. A second uplink TOA may be determined at a second node or an LMU from the set of signal samples at step 1020. In an embodiment of the present subject matter, the search window may be determined as a function of sector geometry. In another embodiment of the present subject matter, the first node may be a serving node and the second node a neighboring node. In a further embodiment, the first node may be a neighboring node and the second node a serving node or neighboring node. At step 1030, a range estimate of the wireless device may be determined, and at step 1040 an estimated location of the wireless device determined as a function of the first uplink TOA, the second uplink TOA, or the range estimate and second TOA.

Figure 11:
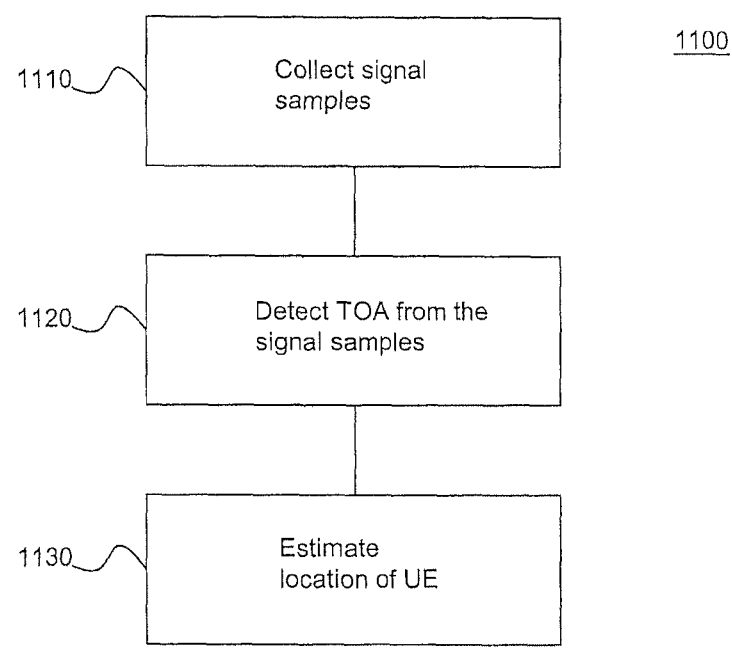
FIG. 11 is an algorithm according to yet another embodiment of the present subject matter.

FIG. 11 is an algorithm according to yet another embodiment of the present subject matter. With reference to FIG. 11, a method for estimating a location of a wireless device 1100 is provided. At step 1110, signal samples from a wireless device may be collected by one or more LMUs, and at step 1120 a TOA detected from the signal samples where the TOA is detected by segmenting the collected signal samples to a predetermined length, determining an ambiguity function or correlation for each segment, and adding the ambiguity functions or correlations to detect a TOA. In another embodiment of the present subject matter, the TOA may be detected by determining a mixing product of the collected signal samples, decimating the mixing product, segmenting the decimated product to predetermined lengths, determining ambiguity functions for each segment, and adding the ambiguity functions to detect a TOA. A demeaned peak to standard deviation ratio may be applied to the added ambiguity functions and/or correlations. In one embodiment, the ambiguity functions and/or correlations may be coherently or non-coherently added. At step 1130, an estimated location of the wireless device may be determined as a function of the TOA. A further embodiment of the present subject matter may also select a TOA as a function of a detection threshold or quality.

Figure 12:
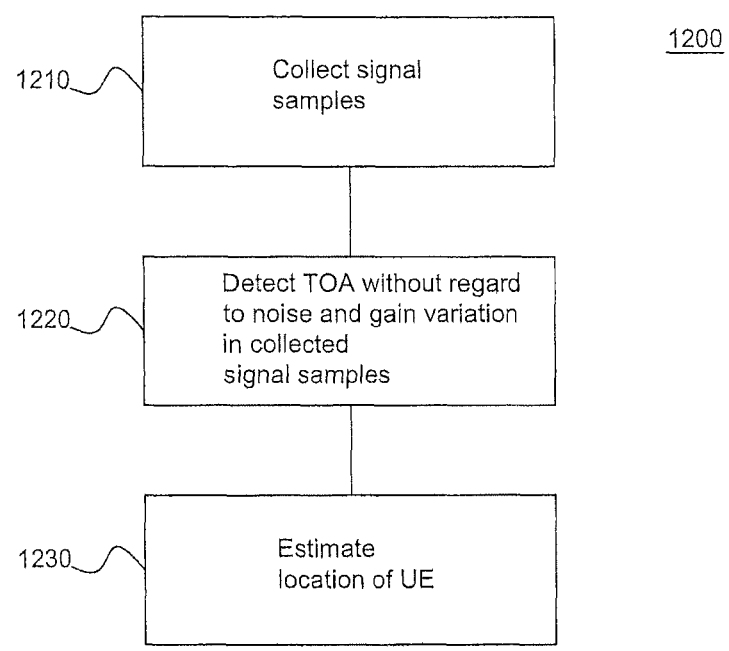
FIG. 12 is an algorithm according to one embodiment of the present subject matter.

FIG. 12 is an algorithm according to one embodiment of the present subject matter. With reference to FIG. 12, a method for estimating a location of a wireless device 1200 is provided. At step 1210, signal samples may be collected from a wireless device by one or more LMUs, and at step 1220 a TOA detected from the signal samples where the TOA is detected without regard to the noise and gain variation in the collected signal samples. At step 1230, an estimated location of the wireless device may be determined as a function of the TOA.

FIG. 13 is an algorithm according to an embodiment of the present subject matter. With reference to FIG. 13, a method for estimating a location of a wireless device 1310 in a wireless communication system having a plurality of nodes and a plurality of LMUs is provided. At step 1310 a set of signal samples from a first wireless device and a second wireless device may be collected by one or more LMUs in a search window determined as a function of a first uplink TOA from a first node. At step 1320, a second uplink TOA may be detected at a second node or LMU from the set of signal samples by a plurality of non-coherent additions of ambiguity functions. In one embodiment of the present subject matter, the second TOA may be detected by segmenting the collected signal samples to a predetermined length, determining an ambiguity function or correlation for each segment, and adding the ambiguity functions or correlations to detect the TOA. These steps may be iteratively repeated for different sized portions. A demeaned peak to standard deviation ratio may be applied to the added ambiguity functions or correlations. In another embodiment of the present subject matter, the second TOA may be detected by determining a mixing product of the collected signal samples, decimating the mixing product, segmenting the decimated product to predetermined lengths, determining ambiguity functions for each segment, and adding the ambiguity functions to detect the TOA. These steps may also be iteratively repeated for different sized portions. A demeaned peak to standard deviation ratio may be applied to the added ambiguity functions. A range estimate of the wireless device may be determined at step 1330 and at step 1340, an estimated location of the wireless device determined as a function of the first uplink TOA, the second uplink TOA, or the range estimate and second TOA.

One aspect of embodiments of the present subject matter is to combine non-coherent and coherent integration methods to achieve a high processing gain in practical applications. Furthermore, the location estimation accuracy may be augmented by adding a range ring.

As shown by the various configurations and embodiments illustrated in FIGS. 1-13, a system and method of UMTS UE location using uplink dedicated physical control and downlink synchronization channels have been described.

While preferred embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

What we claim is:

1. A method for estimating a location of a wireless device in a wireless communication system having a plurality of nodes and a plurality of location measurement units ("LMUs"), the method comprising the steps of:
   (a) collecting signal samples from the wireless device by one or more of the LMUs;
   (b) detecting a time of arrival ("TOA") from the collected signal samples by segmenting the collected signal samples to a predetermined length and by determining a correlation for each segment; and
   (c) determining an estimated location of the wireless device as a function of the detected TOA.

2. The method of claim 1 wherein a demeaned peak to standard deviation ratio is applied to the determined correlation.

3. The method of claim 1 wherein the correlations are coherently or non-coherently added.

* * * * *